United States Patent [19]

Sproule

[11] 3,724,966
[45] Apr. 3, 1973

[54] HYDRAULIC MACHINE CROWN AERATION

[75] Inventor: Robert Stanley Sproule, Montreal, Quebec, Canada

[73] Assignee: Dominion Engineering Works, Limited, Lachine, Quebec, Canada

[22] Filed: June 14, 1971

[21] Appl. No.: 152,568

[30] Foreign Application Priority Data

July 29, 1970 Canada..................................89425

[52] U.S. Cl.....................415/1, 415/110, 415/170 R
[51] Int. Cl..............................................F03b 3/06
[58] Field of Search....,..............................415/1, 110

[56] References Cited

UNITED STATES PATENTS

| | | | |
|---|---|---|---|
| 2,988,154 | 6/1961 | Hub | 415/110 |
| 3,238,534 | 3/1966 | Hartland | 415/1 |
| 3,237,564 | 3/1966 | Hartland | 415/1 |
| 3,239,193 | 3/1966 | Kerensky | 415/1 |
| 3,253,816 | 5/1966 | Sproule | 415/1 |
| 3,279,378 | 10/1966 | Sproule | 415/110 |
| 3,398,696 | 8/1968 | Sproule | 415/1 |

*Primary Examiner*—C. J. Husar
*Attorney*—Raymond A. Eckersley et al.

[57] ABSTRACT

An aerated turbo-machine such as a Francis turbine utilizes a seal water receiving reservoir to separate air entrained with the seal water, for re-use in machine aeration.

9 Claims, 5 Drawing Figures

INVENTOR.
ROBERT S. SPROULE

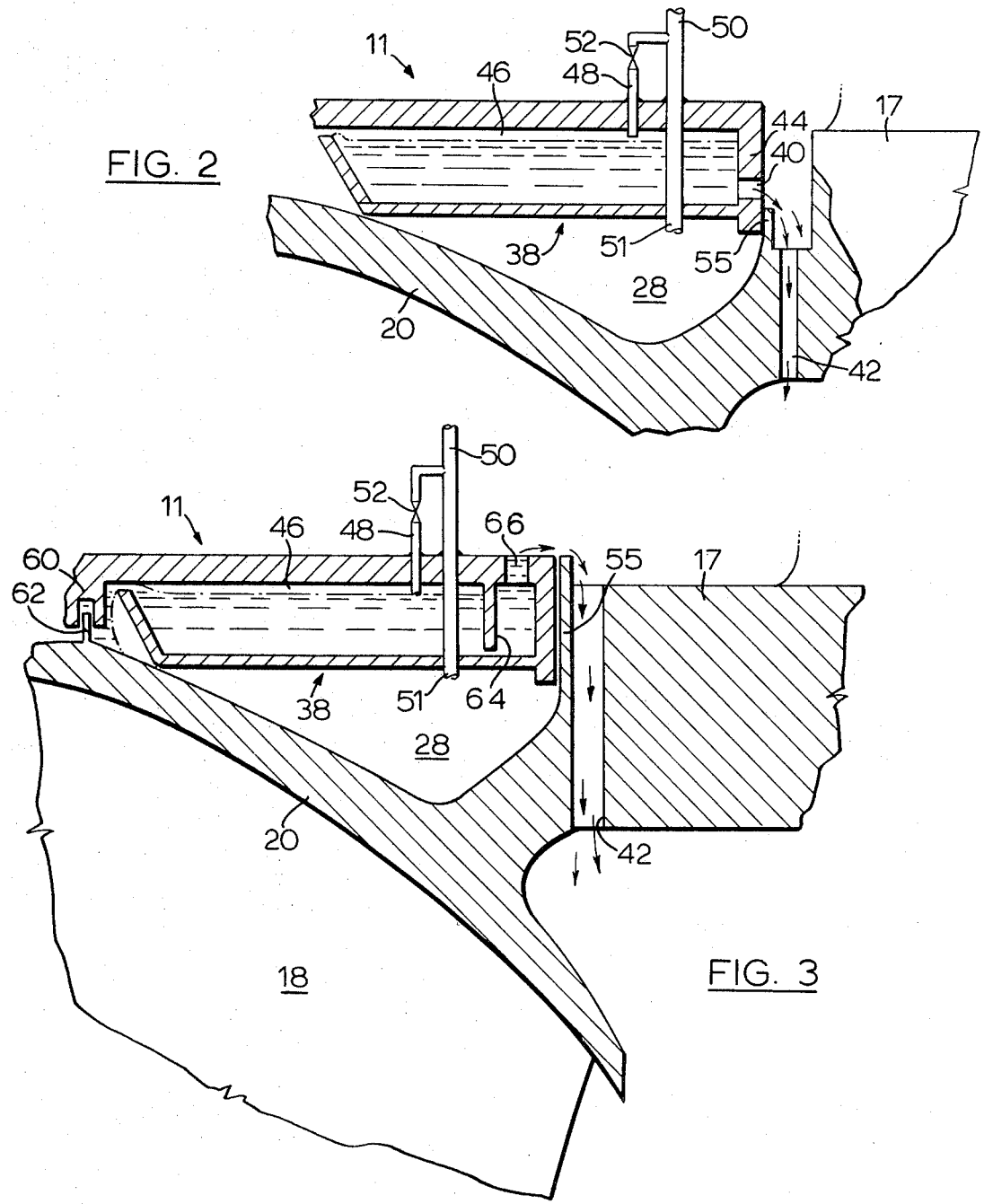

HYDRAULIC MACHINE CROWN AERATION

This invention is directed to an aerated hydraulic turbo machine and in particular to a method of operating such a machine to conserve the use of air in aerating the machine, and apparatus for carrying out the method.

In the operation of turbo-hydraulic machines, particularly large Francis turbines, significant steps have been achieved in improving the efficiency of such machines by the introduction of air within the annular spaces bounding the runner shrouds. The effective use of aeration in obtaining efficiency improvements in the order of 1 percent more or less, is dependent upon highly efficient utilization of compressed air. Otherwise, the significant costs in providing compressed air for purposes of aeration tend to overtake the savings which the use of aeration make possible.

The present invention thus provides a method of conserving air for use within a shrouded aeration space, and means for carrying out the method.

The invention further provides a hydraulic turbo machine such as a turbine having a shroud aeration space having a flow limiting seal associated therewith, means within the machine housing, such as within the head cover, to receive liquid on passage through the seal, means to receive air separating from the seal liquid, means to recirculate the retrieved air into a shroud aeration space, and means to pass the substantially de-aerated seal liquid to drain.

The subject invention includes embodiments wherein the de-aerated seal liquid, usually water, passes to the tailrace by means of holes drilled through the runner. In addition, however, the present invention includes arrangements wherein the de-aerated seal water passes from the crown shroud space upwardly by way of an overflow, pressurized by the seal water provision and the pressure of air in the secondary portion of the aerated crown space.

The present invention further provides staged air compression, in which an aerated space having a liquid seal subdividing the space can be supplied in one portion of the space with air at a low pressure relative to compressor delivery, and in an economical fashion, without the need for additional compressor provision such as a low pressure air compressor.

Certain embodiments of the present invention are described, reference being had to the following drawings wherein;

FIG. 2 is a portion of a view similar to FIG. 1, showing an alternative drainage arrangement;

FIG. 3 shows an alternative arrangement to that of FIG. 2, including an alternative intermediate liquid seal;

Figure 1:
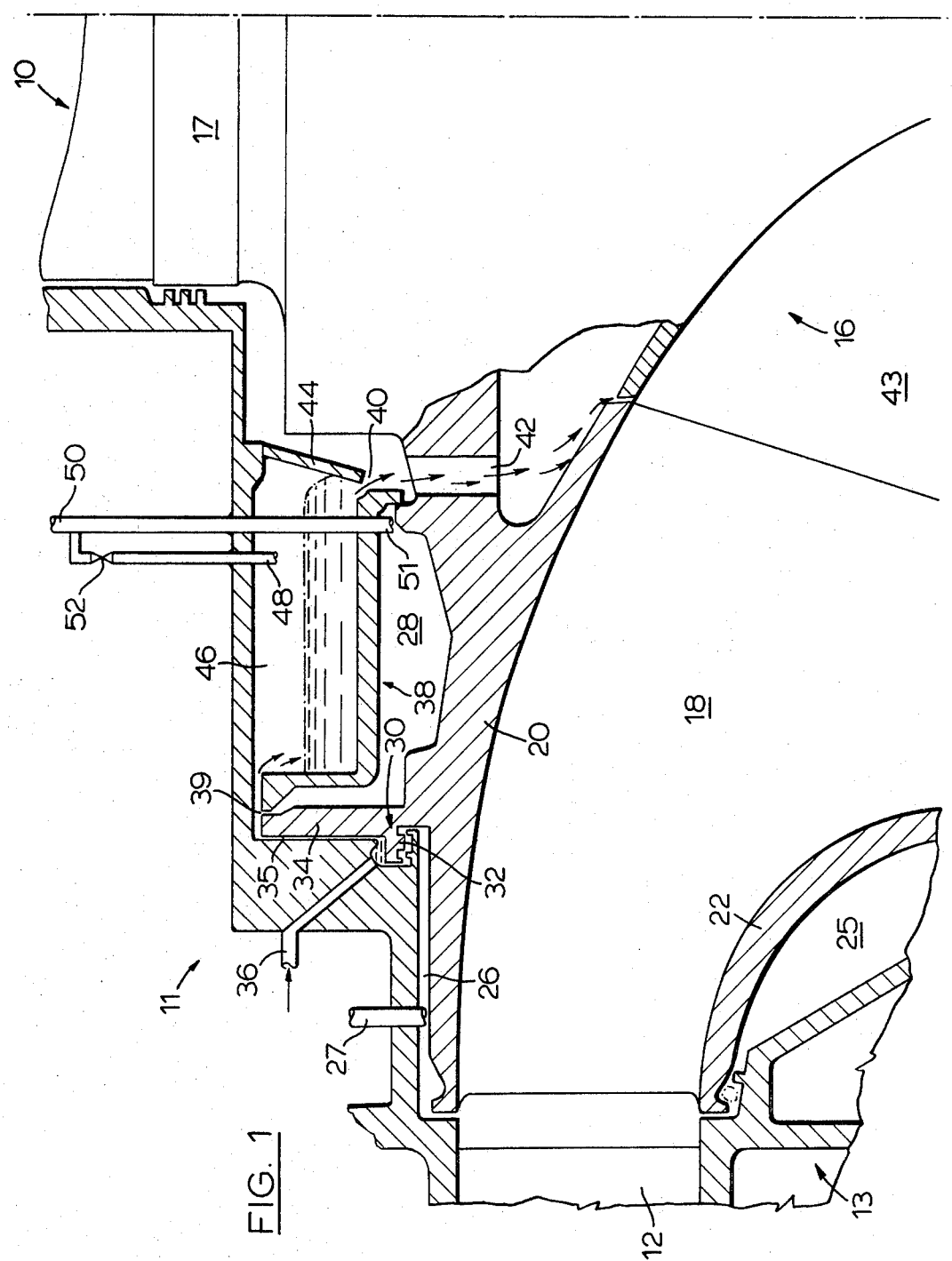
FIG. 1 is a diametral part section in elevation of one embodiment of a Francis turbine according to the present invention.

Referring first particularly to FIG. 1, the machine 10, illustrated as being a Francis turbine, is provided with a crown casing portion 11 having stay plates 12 of the guide ring connecting with the lower casing portion 13. The runner 16 of the machine includes a shaft 17, the blades 18 thereof being supported between the crown shroud 20 and the band or skirt shroud 22.

The band shroud 22 defines with the lower casing portion 13 a band aeration space 25. The corresponding crown aeration space is divided by way of intermediate seal 30 into a radially outer first aeration portion 26 having a high pressure air supply 27 connected thereto, and a radially inner second portion 28.

The intermediate seal 30 is provided with a seal flinger 32 attached to or forming a portion of the crown shroud, which includes an axially extending seal land 34 forming a restricted clearance 35 with an adjacent stationary portion of the head cover. Seal water at a suitably controlled pressure is admitted to the seal 30 by way of pipe 36, and flows inwardly therethrough, as is well known in the art.

Within the second aeration portion 28 there is located a reservoir 38 having an inlet 39 to receive exhausted seal water (liquid), which passes by way of drain 40 and a series of drain holes 42 extending through the runner to the tailrace 43 of the machine.

The drain 40 is formed by an annular drain baffle 44 extending from the head cover 11, which defines an air separation space 46. An air bleed 48 connects the space 46 with an air supply 50, which may be compressed air on occasion to assist in purging the machine of water at start-up, through the inner connection 51 to the radially inner space 28 of the crown aeration zone. An air bleed control valve 52 provides control of the air flow rate. In the case of the embodiments illustrated in FIGS. 2 and 3 there is provided an axially extending crown baffle 55. In FIG. 2 the reservoir 38 is drained from a low point, while in FIG. 3 an intermediate baffle 64 provides a submerged exit 65 from the reservoir 38, which with overflow port 66 permits passage of the exhausted and de-aerated drainage water downwardly through the runner drain holes 42.

Figure 4:
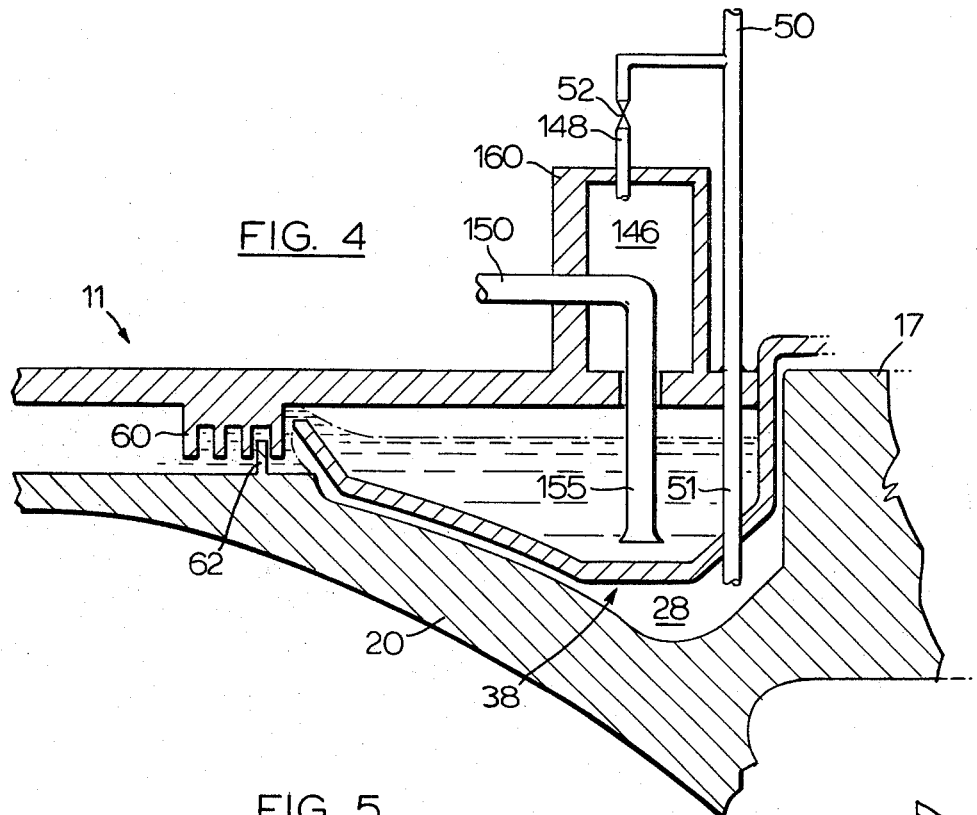
FIG. 4 shows alternative arrangements for liquid drainage and air separation.

In the FIG. 3 and FIG. 4 embodiments there is illustrated a different form of intermediate seal, having a stationary portion 60 and a plurality of coaxial annular rotary ribs 62 extending axially from the crown shroud and serving as a labyrinth seal. Only one rib 62, the radially inner one, is illustrated.

In the FIG. 4 embodiment the form of the reservoir 38 is deepened, and the upwardly extending drain 150 is provided with a submerged drain inlet 155. The wall 160 within the crown casing 11 forms an air separation chamber having an air separation space 146 and connected by way of air bleed 148, air bleed control valve 52 and air supply pipe 51 with the inner aeration space 28.

Figure 5:
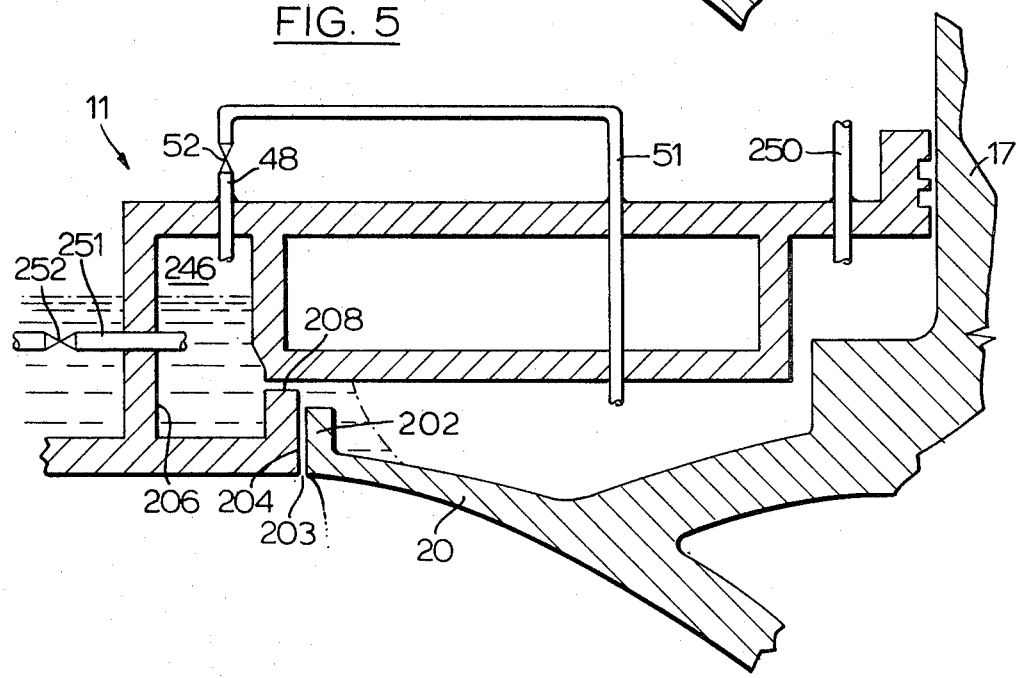
FIG. 5 shows the application of the present invention to the peripheral seal of a different embodiment.

Turning to FIG. 5, the crown shroud 20 has a high pressure edge portion 202 in facing relation with an axial extending portion 204 of the crown 11, forming a restricted passage 203 for the working liquid.

A chamber 206 within the head cover 11 is provided with a drainage entry 208 comprising an annular gallery or one or more drain holes. The chamber 206 drains itself by way of submerged drain pipe 251. An aeration space 246 connects by way of pipe 48, valve 52 and supply line 51 with the radially inner aeration zone of the turbine. A primary aeration supply pipe 250 also is shown.

By suitably controlling the air pressure, the level within the head cover may be controlled. However in general it is practical just to put in sufficient excess air, whereby the water level goes down to where air escapes, mainly as aerated water.

By suitably controlling the air pressure, the level within the head cover may be controlled. However, in general it is practical just to put in sufficient excess air, whereby the water level goes down to where air escapes, mainly as aerated water.

In operation, water from the turbine inlet 12 (FIG. 1) flows towards the shroud space 26. An air inlet 27 provides pressurized air to the space 26, to balance the inlet water pressure so that a stabilized air-water interface is established at or adjacent the radially outer rim of the shroud 20. The annular raised run of shroud 20, which does not constitute a part of the present invention, serves to stabilize the air-water interface by imparting centrifugal energy to the water, by the outwardly and upwardly curved surface of the rim, thus producing local toroidal circulation that tends to maintain the air separate from the water at the interface.

The radially inward passage of air from the shroud space 26 is inhibited by the intermediate seal 30. Pressurized seal water supplied through pipe 36 flows into the seal, the rate of supply producing a sufficient pressure drop across the seal 30 to substantially stabilize the pressure in the shroud aeration space 26.

The flinger 32 of the seal 30 serves to locate the seal air-water interface with shroud space 26 somewhere across the radial width of the flinger bottom face, with the axially projecting shoulder portions of the seal 30 on the bottom face of the flinger and the opposed cooperating stationary shoulders producing local water motion as a stabilized toroidal circulation. This serves to limit the entrainment of air from space 26 with the inflowing seal water supplied from pipe 36.

The water from the seal water supply pipe 36 flows radially inwardly, relative to the flinger 32 and in an upward direction past the seal land 34. The pressure drop of the inflowing seal water is controlled to some extent by the flow restriction provided by the radially restricted clearance 35.

Located radially inwardly of aeration space 26 is a second aeration space 28, functioning at a lower pressure than the space 26. Air from air supply 50 connected to the space 28 serves to exclude water therefrom. A reservoir 38 adjacent the second space 28 receives a major portion of the seal water flowing from the seal 30, and having same quantity of air entrained therein from space 26. The limited radial clearance between the upper end of seal land 34 and the adjoining wall of the reservoir 38 permits the establishment of an air-water interface therebetween. In the FIG. 3 and FIG. 4 alternative embodiments rotary ribs 62 serve the function of the land 34 in energizing the water to stabilize the air-water interface and to promote the flow of seal water into the reservoir 38.

Within the reservoir 38 the air contained or entrained with the seal water from the seal 30 is permitted to separate upwardly into air separation space 46. The pressurized air thus provided to the space 46 passes by way of an air bleed 48 to supply the inner aeration space 28, through the air inlet 51. Excess water received in the reservoir 38 passes therefrom by way of outlets 40 (FIGS. 1 and 2) and outlet box (FIG. 3). In the case of FIG. 4 an upward outlet 155 connects to a drain pipe 150, while in the FIG. 5 embodiment the drainage water leaves the air separation chamber 246 by way of an outlet 251. Owing to the existence of positive air pressure within the respective air spaces 28 in excess of the hydraulic head of the raised water outflow drains, the upward drainage of water from the reservoir 38 is made possible.

With reference to FIG. 5, the aeration space above crown shroud 20 is initially provided with air from air supply pipe 250. Air entrained at the air-water interface created at the shroud radially outer lip passes with the leakage water flowing in through the restricted passage 203, into chamber 206, wherein the entrained air is released to the air space 246. Water removal from the chamber is provided by the submerged drain pipe 251, having outflow restriction 252 to maintain a desired level therein, by control of the water outflow rate.

What I claim as new and desire to secure by Letters Patent of the United States is:

1. The method of maintaining a pressure differential between adjacent shroud spaces within a rotary turbohydraulic machine having a shrouded runner rotatably mounted within a stationary casing, the runner having a high pressure side and a low pressure side, a plurality of blades extending from at least one shroud to receive working liquid therethrough; including the steps of limiting the quantity of non-working liquid flowing from the runner high pressure side towards the low pressure side, to provide a pressure drop in the flow path of non-working liquid; providing an annular gas-liquid interface between an inner gas containing zone and an outer liquid containing zone coaxial therewith and located radially outwardly relative to the machine axis; transferring at least a portion of the limited liquid flow from the zone of said interface, having a portion of gas entrained therewith to a gas separation zone; reducing the velocity of flow of the transferred liquid and gas mixture to promote separation of entrained gas from the liquid; exhausting the transferred liquid, and transferring the separated gas to a gas containing non-working zone to assist in the exclusion of liquid therefrom.

2. The method as set forth in claim 1 wherein said entrained gas is separated from said liquid portion at a level gas-liquid interface under influence of gravity.

3. The method as set forth in claim 2 wherein said portion of liquid flow is transferred outwardly, relative to the axis of said machine, said separated gas being subsequently transferred radially inwardly of said gas-liquid interface.

4. The method as set forth in claim 2 wherein said portion of liquid flow is transferred inwardly relative to the axis of said machine, said separated gas being liberated within a second inner aeration zone operating at a pressure lower than a first outer aeration zone bounded by a said annular gas-liquid interface.

5. A hydraulic machine having a stationary casing; a runner rotatably mounted therein having a plurality of blades extending from a crown shroud to form a working space for the passage of working liquid therethrough, said shroud being spaced from said casing to form non-working coaxial annular spaces therewith; means to limit the flow of working liquid to a said non-working space; means to admit pressurized gas to a non-working space in liquid excluding relation therein; liquid flow guide means to promote the formation of a stable annular gas-liquid interface bounding a gas containing zone of said non-working space; liquid flow transfer means to receive liquid having gas entrained therewith; a closed reservoir connected thereto to receive liquid having gas entrained therewith, to provide gravity separation of entrained gas from the liquid; liquid drain means connecting with the reservoir to limit the level therein, and gas transfer means connecting the closed reservoir with a non-working gas containing zone to conduct separated gas thereto, whereby the utilization of gas in the exclusion of liquid from the non-working zone is promoted.

6. A hydraulic machine as claimed in claim 5 wherein said closed reservoir is located outwardly of said liquid transfer means and said gas transfer means extends inwardly from the reservoir, relative to the main axis of the machine.

7. A hydraulic machine as claimed in claim 5 wherein said closed reservoir is located inwardly of said liquid transfer means.

8. A hydraulic machine as claimed in claim 7 having a radially outer and a radially inner said gas space, said means to limit flow including a liquid filled seal separating said outer and said inner gas spaces, said reservoir being located inwardly therefrom to receive seal liquid in substantially segregated relation from said inner gas space, said gas transfer means connecting a space over said reservoir with said inner gas space.

9. A hydraulic machine as claimed in claim 6 wherein said flow limit means comprises an annular edge of a said shroud positioned in close facing relation with a portion of said casing to provide limited annular access to a said non-working space.

* * * * *